May 27, 1958      HIROSHI ITO      2,836,102

HIGH APERTURE PHOTOGRAPHIC LENS

Filed June 14, 1956

SPHERICAL ABERATION AND UNSATISFIED AMOUNT OF SINE CONDITION

ASTIGMATISM

DISTORTION

SPHERICAL ABERATION AND UNSATISFIED AMOUNT OF SINE CONDITION

ASTIGMATISM

DISTORTION

INVENTOR.
HIROSHI ITO
BY
ATTORNEY

United States Patent Office 2,836,102
Patented May 27, 1958

2,836,102

HIGH APERTURE PHOTOGRAPHIC LENS

Hiroshi Ito, Setagayaku, Tokyo, Japan, assignor to Canon Camera Company, Inc., Tokyo, Japan, a corporation of Japan Application June 14, 1956, Serial No. 591,394

Claims priority, application Japan August 16, 1955

4 Claims. (Cl. 88—57)

This invention relates to a photographic objective and more particularly to an improved high aperture Gauss-type objective.

An object of this invention is to provide an objective of remarkably high aperture by effectively correcting particularly zonal spherical aberration.

It is generally known that there are remarkably numerous kinds of high aperture Gauss-type objectives consisting of six lens elements. These lenses have a common defect in producing no little flair when used at almost full opened diaphragm, since there remains more or less oblique spherical aberration in almost every lens. As I have shown in my prior U. S. Patent No. 2,681,594 entitled, "Photographic objective of Gauss-type" granted June 22, 1954 (corresponding to Japanese Patent No. 205,109, publication No. 6,685/1953), this defect can be remarkably improved by appropriate selection in the arrangement of the refractive indices and radii of curvature at their cemented surfaces of each glass member constituting the Gauss-type lens consisting of six lens elements.

A clearer concept and purpose of this invention may be obtained from the following description, taken in connection with the attached drawing, in which.

Figure 1:
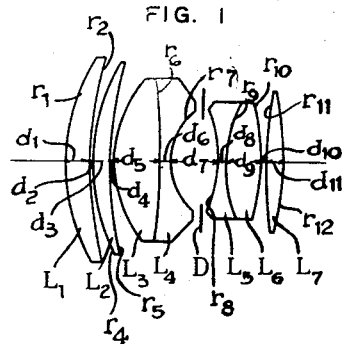
Fig. 1 shows a first illustrative embodiment of the objective of my instant invention of F:1.4.

As shown in the drawing, the objective comprises five components consisting of seven single lenses axially aligned, the first and the second components $L_1$ and $L_2$ being meniscus positive single lenses with their convex surfaces towards the object side of the objective, the third component being a meniscus negative lens with its convex surface also towards the object side comprising two cemented lenses, biconvex lens $L_3$ and biconcave lens $L_4$, the fourth component being a meniscus positive lens with its convex surface towards the image side of the objective and comprising two cemented lenses, biconcave lens $L_5$ and biconvex lens $L_6$, and the fifth component being single biconvex lens. D is a diaphragm positioned between the third component and the fourth component.

The first and second components are two independent single meniscus convex lenses having approximately equal focal lengths. These two lenses correspond to the convex lens of the first component of the conventional Gauss-type objective comprising six lens elements, and provide remarkably superb correction of zonal spherical aberration. Furthermore, by selectively observing the following conditions in respect of the refractive index, radii of curvature and thickness of each lens element of the two cemented meniscus lens components, $L_3$, $L_4$, $L_5$ and $L_6$, a high aperture Gauss-type lens yielding, for instance, an aperture of F:1.2 and angular field ($2\omega$) of approximately 40° can be obtained:

(1)

$0.15 > n_4 - n_3 > 0.05,\ v_3 > v_4$
$1.83 > n_4 > 1.63$
$\infty > |r_6| > 150$ (2)

$0.25 > n_6 - n_5 > 0.05\quad 1.83 > n_6 > 1.60$
$61 > v_6 > 49$
$70 > |r_8| > 38$
$100 > r_9 > 40$ (3)

$60 > r_5 > 45,\ 30 > r_7 > 22$ (4)

$32 > d_5 + d_6 > 20$ and the refractive indices of the three positive lenses $L_1$, $L_2$ and $L_7$ all lie in the range from 1.83 to 1.65.

Conditions (1) serve to have more effective corrections for spherical and chromatic aberrations; conditions (2) are to have more effective correction particularly for oblique spherical aberration, and conditions (3) and (4) are necessary to eliminate astigmatism.

The data of two embodiments of my invention follow, wherein the value of the focal length $f$ is 100, the radii of curvature from the object side of the objective towards the image side thereof is represented consecutively by $r_1, r_2 \ldots r_{12}$, the axial distance between adjacent curved surfaces is $d_1, d_2 \ldots d_{10}$, the refractive index for the D-line of the spectrum and dispersive index of the glass which constitutes the lens element are respectively in order $n_1, n_2 \ldots n_7$ and $v_1, v_2 \ldots v_7$:

Example 1 (Fig. 1)

[$f=100$   F: 1.4   $2\omega=40°$]

| Radius | Thickness and Spacing | Refractive Index $n_d$ | Dispersive Index $v$ |
|---|---|---|---|
| $r_1 = 70.00$ | | | |
| | $d_1 = 8.0$ | $n_1 = 1.6584$ | 50.8 |
| $r_2 = 150.00$ | | | |
| | $d_2 = 0.2$ | | |
| $r_3 = 72.00$ | | | |
| | $d_3 = 7.0$ | $n_2 = 1.6584$ | 50.8 |
| $r_4 = 150.00$ | | | |
| | $d_4 = 0.2$ | | |
| $r_5 = 45.97$ | | | |
| | $d_5 = 17.1$ | $n_3 = 1.6385$ | 49.0 |
| $r_6 = -299.80$ | | | |
| | $d_6 = 4.9$ | $n_4 = 1.7400$ | 28.2 |
| $r_7 = 26.18$ | | | |
| | $d_7 = 18.0$ | | |
| $r_8 = -43.40$ | | | |
| | $d_8 = 2.0$ | $n_5 = 1.5317$ | 48.9 |
| $r_9 = 56.60$ | | | |
| | $d_9 = 14.0$ | $n_6 = 1.6584$ | 50.8 |
| $r_{10} = -69.00$ | | | |
| | $d_{10} = 0.3$ | | |
| $r_{11} = 172.40$ | | | |
| | $d_{11} = 6.5$ | $n_7 = 1.6584$ | 50.8 |
| $r_{12} = -102.62$ | | | |

The focal lengths of the first and second components are 191.7 and 203.1 respectively.

Figure 2:
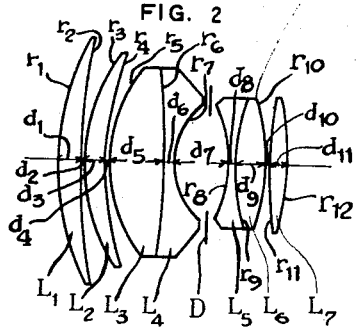
Fig. 2 shows a second embodiment thereof of F:1.2.
Figure 3:
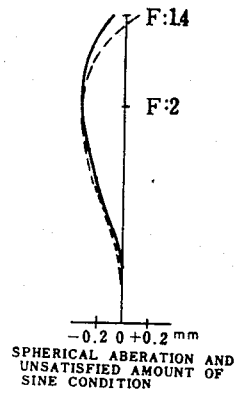
Figs. 3, 4 and 5 show the aberrations of the objective shown in Fig. 1.
Figure 4:
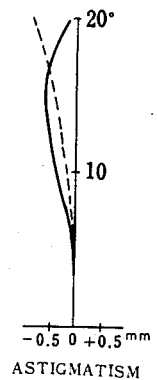
Figure 5:
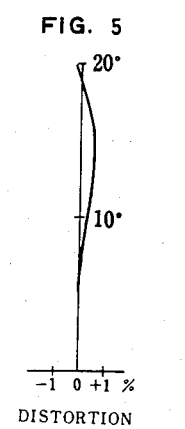
Figure 6:
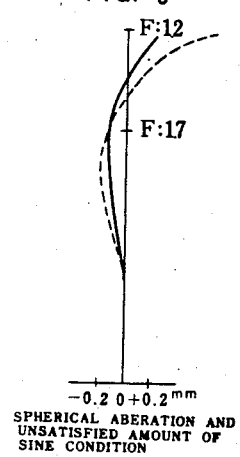
Figs. 6, 7 and 8 show the aberrations of the objective shown in Fig. 2.
Figure 7:
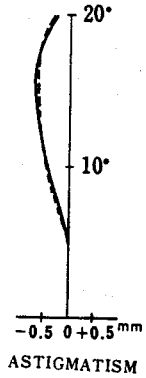
Figure 8:
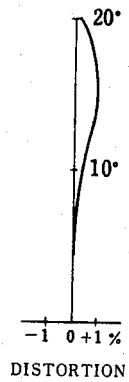

Example 2 (Fig. 2)

[$f=100$    F: 1.2    $2\omega=40°$]

| Radius | Thickness and Spacing | Refractive Index $n_d$ | Dispersive Index $v$ |
|---|---|---|---|
| $r_1 = 94.00$ | $d_1 = 9.00$ | $n_1 = 1.6935$ | 53.5 |
| $r_2 = 251.93$ | $d_2 = 0.21$ | | |
| $r_3 = 68.99$ | $d_3 = 8.00$ | $n_2 = 1.7173$ | 47.9 |
| $r_4 = 120.34$ | $d_4 = 0.96$ | | |
| $r_5 = 50.96$ | $d_5 = 20.48$ | $n_3 = 1.6385$ | 55.5 |
| $r_6 = -321.70$ | $d_6 = 4.39$ | $n_4 = 1.7174$ | 29.5 |
| $r_7 = 27.44$ | $d_7 = 21.31$ | | |
| $r_8 = -43.02$ | $d_8 = 2.13$ | $n_5 = 1.5174$ | 52.5 |
| $r_9 = 76.74$ | $d_9 = 12.40$ | $n_6 = 1.6935$ | 53.5 |
| $r_{10} = -72.86$ | $d_{10} = 2.13$ | | |
| $r_{11} = 181.58$ | $d_{11} = 7.17$ | $n_7 = 1.6935$ | 53.5 |
| $r_{12} = -94.29$ | | | |

The focal lengths of the first and second component are respectively 211.2 and 211.6.

Figs. 3, 4, 5, 6, 7 and 8 show the abberation curves for the D-line of the spectrum of the two foregoing embodiments, from which curves the superb performance of objectives according to this invention can readily be recognized.

What I claim is:

1. A high aperture photographic objective of an improved Gauss-type comprising five components consisting of seven elements, the first component $L_1$ and the second component $L_2$ being spaced single meniscus positive lenses having substantially equal focal lengths, the third component being a negative meniscus cemented lens having a first front biconvex element $L_3$ and a first rear biconcave element $L_4$ of which the convex outer surface faces the object side, the fourth component being a positive cemented lens having a second front biconcave element $L_5$ and a second rear biconvex element $L_6$ of which the convex outer surface faces the image side, the fifth component being a spaced third biconvex element $L_7$, and the object fulfills the following conditions, where $n_{subscript}$ is the index of refraction of the lens element, $v_{subscript}$ the index of dispersion of the $d$-line of the lens element, and $r_{subscript}$ the radius of curvature of the refracting surface, the subscript in each case increasing from the object to the image side:

$$0.15 > n_4 - n_3 > 0.05 \quad v_3 > v_4$$
$$1.83 > n_4 > 1.63$$
$$\infty > |r_6| > 150$$
$$0.25 > n_6 - n_5 > 0.05 \quad 1.83 > n_6 > 1.60$$
$$61 > v_6 > 49$$
$$70 > |r_8| > 38$$
$$100 > r_9 > 40$$
$$60 > r_5 > 45 \quad 30 > r_7 > 22$$

2. A high aperture photographic objective according to claim 1 in which the refractive index of each single element positive component is in the range from 1.65 to 1.83 and the objective also fulfills the condition $32 > d_5 + d_6 > 20$, where $d_{subscript}$ is the thickness of the lens, respectively the spacing between lenses, along the optical axis, the subscript increasing from the object to the image side of the objective.

3. A high aperture photographic objective of improved Gauss type having improved spherical, particularly oblique spherical, and chromatic aberration correction having five air spaced components consisting of a total of seven lens elements of which the numerical data is substantially as follows:

[$f=100$    F:1.4    $2\omega=40°$.]

| Lens | Radius | Thickness and Spacing | Refractive Index | Abbe Number |
|---|---|---|---|---|
| $L_1$ | $r_1=70.00$ | $d_1=8.0$ | $n_1=1.6584$ | $v_1=50.8$ |
| | $r_2=150.00$ | $d_2=0.2$ | | |
| $L_2$ | $r_3=72.00$ | $d_3=7.0$ | $n_2=1.6584$ | $v_2=50.8$ |
| | $r_4=150.00$ | $d_4=0.2$ | | |
| $L_3$ | $r_5=45.97$ | $d_5=17.1$ | $n_3=1.6385$ | $v_3=49.0$ |
| $L_4$ | $r_6=-299.80$ | $d_6=4.9$ | $n_4=1.7400$ | $v_4=28.2$ |
| | $r_7=26.18$ | $d_7=18.0$ | | |
| $L_5$ | $r_8=-43.40$ | $d_8=2.0$ | $n_5=1.5317$ | $v_5=48.9$ |
| $L_6$ | $r_9=56.60$ | $d_9=14.0$ | $n_6=1.6584$ | $v_6=50.8$ |
| | $r_{10}=-69$ | $d_{10}=0.3$ | | |
| $L_7$ | $r_{11}=172.40$ | $d_{11}=6.5$ | $n_7=1.6584$ | $v_7=50.8$ |
| | $r_{12}=-102.62$ | | | | where $L_{subscript}$ is the lens element, $r_{subscript}$ the radius of curvature of the lens element, $d_{subscript}$ the thickness of the lens element or the spacing therebetween along the optical axis, $n_{subscript}$ the index of refraction of the lens element, and $v_{subscript}$ the Abbe number representing the dispersion index of the lens element, each series of subscripts increasing in order from the object to the image side of the objective.

4. A high aperture photographic objective of improved Gauss type having improved spherical, particularly oblique spherical, and chromatic aberration cohrection having five air spaced components consisting of a total of seven lens elements of which the numerical data is substantially as follows:

[$f=100$    F:1.2    $2\omega=40°$.]

| Lens | Radius | Thickness and Spacing | Refractive Index | Abbe Number |
|---|---|---|---|---|
| $L_1$ | $r_1=94.00$ | $d_1=9.00$ | $n_1=1.6935$ | $v_1=53.5$ |
| | $r_2=251.93$ | $d_2=0.21$ | | |
| $L_2$ | $r_3=68.99$ | $d_3=8.00$ | $n_2=1.7173$ | $v_2=47.9$ |
| | $r_4=120.34$ | $d_4=0.96$ | | |
| $L_3$ | $r_5=50.96$ | $d_5=20.48$ | $n_3=1.6385$ | $v_3=55.5$ |
| $L_4$ | $r_6=-321.70$ | $d_6=4.39$ | $n_4=1.7174$ | $v_4=29.5$ |
| | $r_7=27.44$ | $d_7=21.31$ | | |
| $L_5$ | $r_8=-43.02$ | $d_8=2.13$ | $n_5=1.5174$ | $v_5=52.5$ |
| $L_6$ | $r_9=76.74$ | $d_9=12.40$ | $n_6=1.6935$ | $v_6=53.5$ |
| | $r_{10}=-72.86$ | $d_{10}=2.13$ | | |
| $L_7$ | $r_{11}=181.58$ | $d_{11}=7.17$ | $n_7=1.6435$ | $v_7=53.5$ |
| | $r_{12}=-94.29$ | | | | where $L_{subscript}$ is the lens element, $r_{subscript}$ the radius of curvature of the lens element, $d_{subscript}$ the thickness of the lens element or the spacing therebetween along the optical axis, $n_{subscript}$ the index of refraction of the lens element, and $v_{subscript}$ the Abbe number representing the dispersion index of the lens element, each series of subscripts increasing in order from the object to the image side of the objective.

(References on following page)

References Cited in the file of this patent

UNITED STATES PATENTS

| | | |
|---|---|---|
| 2,012,822 | Lee | Aug. 27, 1935 |
| 2,117,252 | Lee | May 10, 1938 |
| 2,319,171 | Warmisham et al. | May 11, 1943 |
| 2,681,594 | Ito | June 22, 1954 |
| 2,701,982 | Angenieux | Feb. 15, 1955 |
| 2,718,174 | Doi | Sept. 20, 1955 |

FOREIGN PATENTS

| 544,658 | Great Britain | Apr. 22, 1942 |
|---|---|---|